(No Model.)
H. G. OSBURN.
ELECTRODE FOR SECONDARY BATTERIES.
No. 478,018. Patented June 28, 1892.
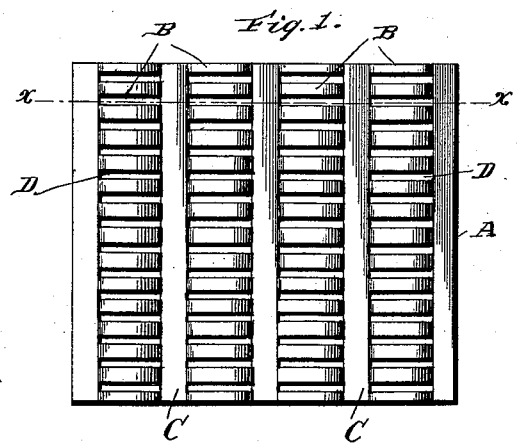
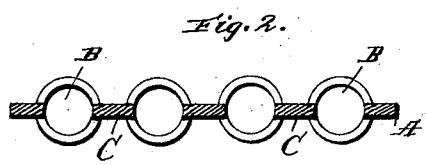
Witnesses:
C. A. Raeder
H. T. Matthews.
Inventor
Harry G. Osburn
by James Sheehy
Attorney
THE NORRIS PETERS CO., PHOTO-LITHO., WASHINGTON, D. C.

UNITED STATES PATENT OFFICE.

HARRY G. OSBURN, OF CHICAGO, ILLINOIS.

ELECTRODE FOR SECONDARY BATTERIES.

SPECIFICATION forming part of Letters Patent No. 478,018, dated June 28, 1892.

Application filed April 7, 1891. Serial No. 387,921. (No model.)

*To all whom it may concern:*

Be it known that I, HARRY G. OSBURN, a citizen of the United States, residing at Chicago, in the county of Cook and State of Illinois, have invented certain new and useful Improvements in Storage-Batteries; and I do declare the following to be a full, clear, and exact description of the invention, such as will enable others skilled in the art to which it appertains to make and use the same.

The aim of the present improvement is to overcome one of the difficulties experienced in electrodes of storage-batteries or accumulators—namely, to support the active material or the material to become active—such as peroxide of lead—in a manner which will permit free access of the electrolyte to a large area or surface of such active material, effectually prevent the said material from becoming detached from the supporting body or plate of the electrode, and to cheapen the manufacture of the improved electrode. It has also been proposed to form electrodes in two or more separable parts, so that access may be had to the cells; but this mode of construction has been found objectionable, inasmuch as the cells when thus constructed will not give the firmness desired for the active material or material to become active.

Prior to my invention electrodes for storage-batteries were made by casting a metallic supporting-plate with connected cells or receptacles arranged so close together as to be practically continuous and formed with openings in their top and bottom sides, and in the cells and openings thereof is pressed the active material which forms substantially a continuous body of active material. In this my present specification I contemplate the use of a series of longitudinal receptacles placed parallel with each other and connected by integral webs, which, as compared with the diameter or width of the longitudinal receptacles, is made quite thin and is arranged about centrally of the receptacles, the latter being provided with transverse slots or openings. A supporting-plate for active material, the two forming an electrode for an accumulator, is important in that while the active material is thoroughly retained in position within a substantial support and a large surface of said active material is exposed to the electrolytic fluid, at the same time the plate can yield or bend in the lines of juncture, or the thin webs joining the receptacles when the electrode is jarred or broken, whereby the active material will still be held in place within the receptacles, even though the webs are bent, it being obvious that the receptacle itself will not become bent or damaged in any manner. The active material is inclosed on each side by separate walls of the adjacent cells, and in case of expansion of one row the adjacent rows are not affected, which is quite important, as, if the rows were permitted to come together, they have a tendency to push each other until the plate would finally break.

The construction of my improved plate is such that it combines the necessary strength for proper support of the active material without effecting an increase in the weight of the plate, and, again, should the plate become bent or deflected in the line of one or more of its thin webs it can be readily straightened out to assume its initial position without loosening the active material from the plate.

In the accompanying drawings, Figure 1 is a plan view of an electrode for secondary batteries embodying my improvements, and Fig. 2 is a cross-sectional view on the plane indicated by the line $x\ x$ of Fig. 1.

Referring by letter to said drawings, A designates the improved battery-plate, which is of the general rectangular form shown in Fig. 1, said plate comprising a series of longitudinal parallel receptacles or cells B B and the intermediate webs or ribs C C integral with the parallel receptacles and serving to join the same longitudinally. Each receptacle or cell is separate from and independent of the adjacent cells of the plate, and each receptacle is provided with a series of transverse slots $b\ b'$, formed in the upper and lower sides thereof, the webs being between the terminals of the slots. In cross-section each tube may be of any desired form, although I prefer to make them circular in cross-section, as shown in Fig. 2; but this is not essential. The webs or ribs C C are arranged centrally of the receptacles or cells, and they are quite thin when compared with the diameter or width of the receptacles, so as to permit the plate to bend or yield between the receptacles when the electrodes are jarred or shaken, and thereby preserve the receptacles and active material intact. The active material, usually peroxide of lead in a plastic state, is pressed or forced into the receptacles and into the slots therein, whereby projections or ribs are formed in the active material which fit in the slots, and thereby retain the filling in the receptacle and at the same time expose a largely-increased area of the active material to the electrolyte.

What I claim as new is—

1. An electrode-plate for storage-batteries formed from a single piece of material and comprising the independent longitudinal slotted receptacles and the thin connecting pliable webs intermediate of said receptacles and between the terminals of the slots, substantially as and for the purpose described.

2. An electrode-plate formed from a single piece of material and having its independent cells or receptacles joined by thin pliable webs, on the lines of which the plate is free to yield or give, and thereby preserve the receptacles and active materials intact, substantially as described.

In testimony whereof I affix my signature in presence of two witnesses.

HARRY G. OSBURN.

Witnesses:
 FRED PAPENBROOK,
 JOE V. HICKEY.